United States Patent [19]

Kim et al.

[11] 3,748,572

[45] July 24, 1973

[54] WIDE FREQUENCY RANGE PHASE SHIFTER DEVICE

[75] Inventors: Kap S. Kim; Thomas V. Saliga, both of Clearwater, Fla.

[73] Assignee: Honeywell Information Inc., Waltham, Mass.

[22] Filed: May 4, 1972

[21] Appl. No.: 250,265

[52] U.S. Cl.................... 323/106, 321/52, 323/124, 333/17
[51] Int. Cl. ............................................. G05f 1/68
[58] Field of Search................... 323/101, 106, 121, 323/124, 129; 307/89, 125, 130; 321/52, 53, 54; 333/2, 17, 18, 19, 29

[56] References Cited
UNITED STATES PATENTS

| | | | |
|---|---|---|---|
| 3,199,037 | 8/1965 | Graves............................ | 323/101 X |
| 3,378,785 | 4/1968 | Nordahl.............................. | 323/101 |
| 3,196,368 | 7/1965 | Potter................................. | 323/124 |
| 3,084,320 | 4/1963 | Hoffman et al.................. | 323/106 X |
| 3,548,296 | 12/1970 | Sundstrom...................... | 323/106 X |

*Primary Examiner*—Gerald Goldberg
*Attorney*—Nicholas Prasinos, Ronald T. Reiling et al.

[57] ABSTRACT

A wide frequency range phase shifter for shifting phase of an ac signal by a predetermined amount with less than one degree phase error over substantially a five to one frequency range. A phase detector compares the phase of an input signal with the phase of the input signal that has been shifted by a predetermined amount and provides an output signal which is a measure of the phase difference between the two inputs. The resulting signal is integrated and applied back to a voltage controlled phase shifter in such a direction so as to correct any error in the amount of the predetermined delay.

11 Claims, 2 Drawing Figures

WIDE FREQUENCY RANGE PHASE SHIFTER DEVICE

BACKGROUND OF THE INVENTION

1. Field of the Invention

This invention relates generally to phase shifters and more particularly to an accurate wide frequency range voltage controlled phase shifter.

2. Description of the Prior Art

Radio frequency systems have a frequently recurring requirement for a device which can accept a sinusoidal signal of arbitrary frequency and deliver a pair of sinusoidal signals of the same frequency and amplitude and with a predetermined phase relationship between them such as 90° or 180°. Wide-band electrical networks, using transformer techniques, are currently available which can achieve a quadrature phase shift but with typical 3° or 4° phase errors over their frequency band of operation. However, this does not provide the requisite accuracy over the frequency range for many applications, for example, in isolating devices and in hybrid junctions. In some signal processing apparatus, for example, it is desired to suppress certain signals over a wide frequency range. Generally, in a suppression device it is required to have one signal 180° out of phase with the signal that is to be suppressed. Whereas in prior art devices, it is possible to obtain an accurate signal which is 180° out of phase with the original signal, the range of frequencies over which high accuracy is obtained with such prior art devices is generally quite narrow. Moreover, as the frequency is varied typical 3° or 4° phase errors creep in on the phase shifted signal.

With this invention a predetermined phase shift is obtained over at least a 5 to 1 frequency range. The greatest accuracy is achieved in practice at 90° and the accuracy is primarily determined by the accuracy of the phase comparator's null point. With transformerless design, this accuracy can be at least ± 0.1°.

OBJECTS

It is an object, therefore, of the instant invention to provide an improved phase shifter.

It is a further object of the invention to provide an accurate wide frequency range phase shifting device for shifting the phase of an electronic signal by a predetermined number of degrees.

It is still a further object of the invention to provide an accurate wide frequency range phase shifting device that can be made inexpensively compared to other prior art devices.

These and other objects and advantages of the invention will become apparent from the description of a preferrrd embodiment of the invention when read in conjunction with the drawing contained herewith.

SUMMARY OF THE INVENTION

Briefly, the invention herein disclosed is a wide frequency range phase shifter for shifting phase by a predetermined amount and having less than a 1° phase error over at least a 5 to 1 frequency range. A phase detector compares the phase of an input signal with the phase of a signal which has been shifted in phase by a predetermined amount and provides an output signal which is proportional to the phase difference between the two signals. The resulting output signal is integrated resulting in a dc phase error signal which is applied back to the voltage controlled phase shifter, which provided the initial phase shift. The phase error signal is applied in such a direction so as to correct any error in the amount of the predetermined phase shift. Thus as the phase difference between the original and the shifted signal changes from the predetermined amount because of variations in frequency or other causes, this change is detected and transformed into an electrical signal which is applied so as to maintain the accuracy of the predetermined phase shift.

DESCRIPTION OF A PREFERRED EMBODIMENT

GENERAL

Figure 1:
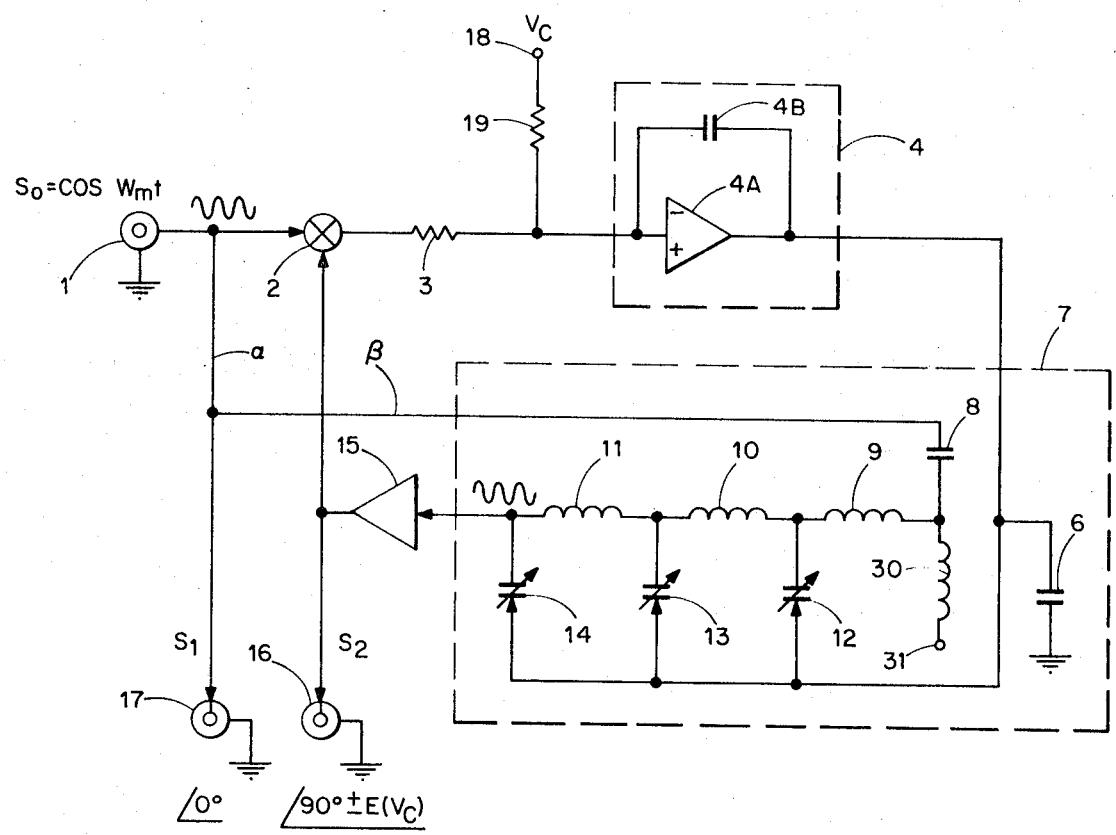
FIG. 1 is a schematic diagram of the preferred embodiment of the invention.

FIG. 1 is a simplified diagram of an embodiment of the device. It is basically a first order phase-lock loop implemented with a wide-band phase detector 2 (which may be a wide-band balanced mixer), an analog integrator 4, and a wide-band voltage controlled phase shifter 7 (phase-lock loops and their function are discussed in a book by Andrew J. Viterbi entitled *Principles of Coherent Communication* and published by McGraw-Hill Book Company in 1966.) Conventional phase-lock loops however employ a voltage controlled oscillator and a low pass filter that does not usually achieve wide-band operation. It follows from phase-lock loop theory that signal $S_2$ the delayed signal, (in FIG. 1) should be an exact quadrature relation (or other predetermined amount) with signal $S_1$ the original signal under steady-state conditions. The most significant obstacles to achieving the desired results with a desired accuracy in practice are the direct current offset voltages e.g. drift, and currents associated with the phase detector and operational amplifier. With current technology, however, and with moderate cost components desired results are obtained with 1° phase error or less, in this invention.

The frequency range over which this device will function is primarily limited by the voltage-controlled phase-shifter. With available voltage variable capacitor diodes, the ratio of high to low frequency range is now limited to about a 5 to 1 ratio. For example, the device may be made to function with an input sinusoid which has any frequency between $2MH_z$ and $10MH_z$. With automatic switching of the voltage variable capacitor diodes, much larger ratios may be achieved.

An additional feature of the device is the ability of introducing an artifical voltage offset $V_c$ at terminal 18 to effect a controlled phase offset from the predetermined phase condition of, for example, 90°. Since the sensitivity or gain of the phase detector is normally quite linear for up to 30° phase errors, the phase offset error "$\epsilon$" is therefore easily voltage controlled, and is a linear function of the control voltage $V_c$ as follows:

$$\epsilon \text{ (degrees)} = K_1 \sin(K_2 V_c) \cong K V_c$$

where K is some constant determined by the loop parameters, and $V_c$ is as previously defined. Since $K_1$ is proportional to the amplitude of the output signal $S_2$, maximum phase shifter accuracy is achieved when $V_c = 0$, giving an overall 90° shift.

The phase-shifted output signal $S_2$ on output terminal 16 may therefore be clearly phase modulated in a linear fashion by the control voltage $V_c$. Thus, this device may also serve as a linear phase modulator with a peak deviation of about 30°.

DETAILED DESCRIPTION OF THE PREFERRED EMBODIMENT

Referring now to FIG. 1, a sinusoidal signal is applied to input terminal 1. A portion of this signal is applied to phase detector 2 which may be a wide-band balanced mixer, and another portion of the signal is applied to voltage controlled phase shifter 7 through paths α and β. Although not required for the purposes of this invention a portion of the input signal may also be applied to the output terminals 17, when required, for comparison purposes. The voltage controlled phase shifter 7 is comprised generally of an LC circuit array having one or more inductors 9, 10 and 11 connected in series and coupled to voltage variable capacitors 12, 13 and 14 which may be vari-caps or varactors, although other voltage variable reactance devices may be utilized. The capacitor 8 in series with the LC circuit prevents any dc voltage from appearing in the input circuit. DC bias voltage for the variable capacitance devices 12, 13 and 14 is applied at terminal 31 through inductor 30 which is chosen to filter out ac components.

The portion of the input signal that is applied to the voltage controlled phase shifter circuit 7 is phase shifted by a predetermined amount, depending on the values of the inductors 9, 10 and 11 and capacitors 12, 13 and 14 of the LC circuit which is normally chosen to be 90°. This shifted signal is then applied to wideband amplifier 15 which acts as a buffer amplifier for the delayed signal. The output signal of amplifier 15 is applied to output terminal 16 and also to phase detector 2. At this point in time, the input signals of the phase detector should have a predetermined phase difference depending on the amount of the phase shift. The phase detector 2 detects this predetermined difference of the input signals and generates a signal ($S_2 \times S_1$) which is applied to the integrator circuit 4 for integrating the ac signal and providing a dc control output signal. The integrator circuit 4 is comprised basically of an operational amplifier 4A and a capacitor 4B across the operational amplifier. It is this integrated dc signal of the input signal ($S_2 \times S_1$) which is applied to vary the capacitance of the voltage controlled capacitors 12, 13 and 14 when there is a phase error between signals $S_1$ and $S_2$ so that they are set to provide the correct predetermined phase shift in this case 90°. Should any unwanted ac signals appear in the output of integrator 4, a bypass capacitor 6 is provided to bypass these unwanted ac signals to ground. Resistor 3 and capacitor 4B set the time constant of the integrator. This time constant together with the phase detector's volts per radian constant and the phase shifter's radians per volt characteristic sets the loop's bandwidth and dynamic characteristics. Thus, with proper choice of constants, the input frequency at terminal 1 may vary rapidly with time and the output at terminal 16 reproduces this signal, with the designated phase shift, and a very small dynamic phase error. Resistor 19 determines the degrees per volt constant of the external phase-shift control voltage, $V_c$.

Figure 2:
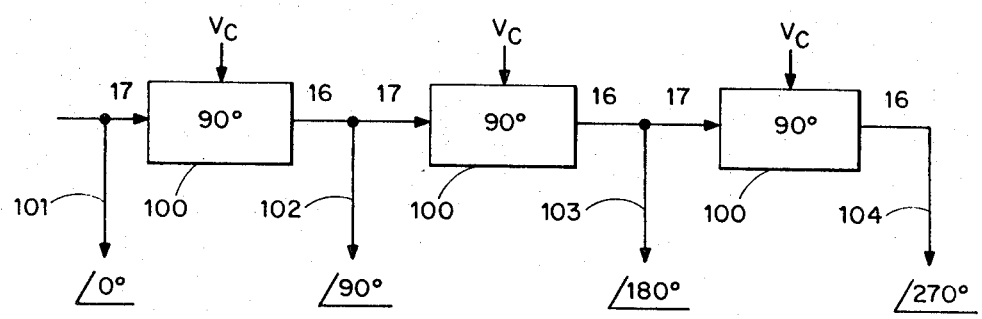
FIG. 2 is a block schematic diagram illustrating various phase shift capabilities of the invention.

The phase shifted output signal is obtained from the output terminal 16 whereas the original signal may be obtained at output terminal 17 so that the two signals, the in phase signal and the phase shifted signal, may be further processed. For example, in a signal processing system, it is often desired to have signals at all multiples of 90° simultaneously available. This may be achieved by placing three of these devices in tandem as shown in Fig. 2. Referring to FIG. 2, three quadrature phase shifters 100 shown in FIG. 1 and described supra are connected in tandem via terminals 16, 17. (Note the same numerals as shown in FIG. 1 are used to indicate the coupling in relating to FIG. 1.) The resultant 90°, 180°, and 270° phase shifts are indicated by arrows 102, 103 and 104.

Having shown and described one embodiment of the invention, those skilled in the art will realize that many variations and modifications can be made to produce the described invention and still be within the spirit and scope of the claimed invention.

What is claimed is:

1. A wide range phase shifter network for shifting the phase of an ac signal by a predetermined amount comprising:

a. a voltage controlled phase shifter electrical circuit for shifting the phase of an ac electrical signal by a predetermined amount in repsonse to a dc phase error voltage signal;

b. a phase detector for comparing the phase of the ac input signal with a phase of the ac input signal that has been shifted by a predetermined amount to obtain an ac phase difference signal which is proportional to the phase difference between the input signals, said phase detector being coupled to said voltage controlled phase shifter;

c. integrator means coupled to said phase detector and to said voltage controlled phase shifter, said integrator means integrating the phase-difference ac signal to produce the dc phase error voltage signal which is proportional to the ac phase difference signal; and d. input and output means coupled to said phase detector for applying and abstracting electronic signals to and from said wide range phase shifter network respectively.

2. A wide range phase shifter network as recited in claim 1 wherein said phase detector comprises a wideband balanced mixer.

3. A wide range phase shifter network as recited in claim 2 wherein said voltage controlled phase shifter circuit is an LC circuit comprising inductors and voltage variable capacitors.

4. A wide range phase shifter network as recited in claim 3 wherein said voltage variable capacitors are varicaps.

5. A wide range phase shifter network as recited in claim 3 wherein said voltage variable capacitors are varactors.

6. A wide range phase shifter network as recited in claim 1 wherein said integrator means comprise a capacitor across an operational amplifier.

7. A wide range phase shifter as recited in claim 1 including adder means coupled to said phase detector and to said voltage controlled phase shifter, for adding an additional variable input signal to the phase difference signal.

8. A wide range phase shifter as recited in claim 7 wherein said adder means comprise a capacitor across an operational amplifier, and a resistor coupled in series with said capacitor-integrator circuit.

9. A wide range phase shifter network as recited in claim 1 including additional input signal means coupled to said phase detector and to said integrator means, said input means for applying an additional input signal to said wide range phase shifter network.

10. A wide range phase shifter network as recited in claim 1 wherein said output means comprise one output means for abstracting an in-phase output signal and one output means for abstracting a phase-delayed output signal.

11. A method for accurately shifting the phase of an ac signal by a predetermined amount comprising the steps of:

a. shifting the phase of an ac signal by a predetermined amount;

b. comparing the phase of the ac signal which has been shifted by a predetermined amount to the phase of an incoming ac signal;

c. obtaining an ac phase-difference signal representative of the difference of the phase of the incoming ac signal and the phase-shifted ac signal;

d. integrating the ac phase-difference signal to obtain a dc phase-difference signal; and e. correcting the amount of the predetermined phase shift of the ac signal in response to said dc phase-difference signal.

* * * * *